United States Patent [19]
Haas

[11] Patent Number: 5,774,814
[45] Date of Patent: Jun. 30, 1998

[54] MULTIPLY-DETECTED MACRODIVERSITY METHOD AND SYSTEM FOR WIRELESS COMMUNICATIONS

[75] Inventor: Zygmunt J. Haas, Ithaca, N.Y.

[73] Assignee: Cornell Research Foundation, Inc., Ithaca, N.Y.

[21] Appl. No.: 620,207

[22] Filed: Mar. 22, 1996

[51] Int. Cl.$^6$ ...................................................... H04Q 7/20
[52] U.S. Cl. .......................... 455/524; 455/504; 455/436
[58] Field of Search ............................. 379/59; 375/347, 375/267; 455/133, 134, 135, 423, 422, 428, 464, 500, 506, 513, 436, 524, 504, 54.1, 33.2, 33.4, 31.3, 39, 69

[56] References Cited

U.S. PATENT DOCUMENTS

| | | | |
|---|---|---|---|
| 5,065,449 | 11/1991 | Gordon et al. | 455/15 |
| 5,260,700 | 11/1993 | Merchant et al. | 340/825.44 |
| 5,319,795 | 6/1994 | Hamabe et al. | 455/33.2 |
| 5,375,259 | 12/1994 | Lee | 455/134 |
| 5,459,873 | 10/1995 | Moore et al. | 455/277.1 |
| 5,539,749 | 7/1996 | Eul | 370/95.3 |
| 5,542,107 | 7/1996 | Kay | 455/33.1 |
| 5,574,983 | 11/1996 | Douzono et al. | 455/69 |

OTHER PUBLICATIONS

Zurbes, S. et al., "A New Architecture for Mobile Radio with Macroscopic Diversity and Overlapping Cells", PIMRC '94, The Hague, Netherlands, Sep. 1994, pp. 640–644.

Bernhardt, R.C., "RF Performance of Macroscopic Diversity in Universal Digital Portable Radio Communications: Frequency Reuse Considerations", IEEE ICC'86, Toronto, Ont., Canada, Jun. 1986, pp. 862–870.

Bernhardt, R.C., "Macroscopic Diversity in Frequency Reuse Radio Systems", IEEE J. on Sel. Areas in Comm., SAC–5, Jun. 1987.

Schiff, L., "Statistical Suppression of Interference with Diversity in a Mobile–Radio Environment", IEEE Trans. on Veh. Tech. 1972, VT–21, pp. 121–128.

Sowerby, K.W. et al., "Selection Diversity in Multiple Interferer Mobile Radio Systems", Elect. Letters, 1988, 24, pp. 1511–1513.

Wang, L.C. et al., "Macrodiversity Cochannel Interference Analysis", Electron. Letters, 13th Apr. 1995, vol. 31, No. 8, pp. 614–616.

Yao, Y.D. et al., "Investigation Into Cochannel Interference in Microcellular Mobile Radio Systems", IEEE Trans. on Veh. Tech., 1992, VT–41, pp. 114–123.

Yeh, Y.H. et al., "Outage Probability in Mobile Telephone with Directive Antennas and Macrodiversity", IEEE J. on Sel AReas in Comm., 1984 SAC 2, pp. 507–511.

*Primary Examiner*—Nguyen Vo
*Assistant Examiner*—Darnell R. Armstrong
*Attorney, Agent, or Firm*—Jones, Tullar & Cooper, P.C.

[57] ABSTRACT

A method and system for detecting and receiving radio signals employ a modified macrodiversity scheme known as multiply-detected macrodiversity (MDM) in which multiple versions or replicas of a signal are detected by a plurality of receivers or base-stations, and are employed by a decision-making algorithm to determine the information content of the signal. This is in contrast to a conventional macrodiversity scheme in which only one version of the signal is employed to determine its information content, this typically being the highest quality version of the signal, such as the strongest received signal. The method of the present invention is particularly suited for use in cellular wireless systems, and can provide a substantial increase in the probability that correct signal data is received when a mobile transmitting station is located near the boundary of a cell, and the average signal quality received by adjacent base stations is almost as good as the average signal quality received by the cell's serving base-station. In this situation, the decision-making algorithm employs the information bits in each received signal depending on the calculated probabilities of a correct bit reception and of an erroneous bit reception for each base-station, these probabilities being calculated in accordance with average signal quality.

12 Claims, 3 Drawing Sheets

| Condition | A | B | C | D | E | F | G | H | Condition |
|---|---|---|---|---|---|---|---|---|---|
| $Pc0 \cdot Pc1 \cdot Pe2$ | > | > | > | > | < | < | < | < | $Pe0 \cdot Pe1 \cdot Pc2$ |
| $Pc0 \cdot Pe1 \cdot Pc2$ | > | > | < | < | > | > | < | < | $Pe0 \cdot Pc1 \cdot Pe2$ |
| $Pe0 \cdot Pc1 \cdot Pc2$ | > | < | > | < | > | < | > | < | $Pc0 \cdot Pe1 \cdot Pe2$ |

| BS0 | BS1 | BS2 | Final Decision | | | | | | | |
|---|---|---|---|---|---|---|---|---|---|---|
| 0 | 0 | 0 | 0 | 0 | 0 | 0 | 0 | 0 | 0 | 0 |
| 0 | 0 | 1 | 0 | 0 | 0 | 0 | 1 | 1 | 1 | 1 |
| 0 | 1 | 0 | 0 | 0 | 1 | 1 | 0 | 0 | 1 | 1 |
| 1 | 0 | 0 | 0 | 1 | 0 | 1 | 0 | 1 | 0 | 1 |
| 0 | 1 | 1 | 1 | 0 | 1 | 0 | 1 | 0 | 1 | 0 |
| 1 | 0 | 1 | 1 | 1 | 0 | 0 | 1 | 1 | 0 | 0 |
| 1 | 1 | 0 | 1 | 1 | 1 | 1 | 0 | 0 | 0 | 0 |
| 1 | 1 | 1 | 1 | 1 | 1 | 1 | 1 | 1 | 1 | 1 |

MULTIPLY-DETECTED MACRODIVERSITY METHOD AND SYSTEM FOR WIRELESS COMMUNICATIONS

BACKGROUND OF THE INVENTION

1. Field of the Invention

The present invention relates to a method and system for determining the information content of wireless communications signals through analysis of multiply-detected versions of the signals.

2. Background Art

The principle behind the cellular wireless system is that of concurrency; wireless channels are spatially reused to increase the overall network capacity. Channels are reused in such a way that the interference generated by one wireless entity on another (mobiles, base-stations) which is assigned the same channel is minimal.

To implement the channel reuse, the coverage area is fragmented into cells. Ideally, the cells are described as hexagons of equal size. In practice, the sizes and the shapes of the cells vary greatly based on the network design and the propagation conditions in the area. In the middle of each cell there is a base-station, equipped with a transmitter/receiver pair. The base-stations maintain wireless links with the mobiles in their coverage area and are also interconnected by a wireline network. Each mobile station is also equipped with a transmitter/receiver pair. While in a cell, a mobile is associated with the base-station serving this cell. As the mobile roams between cells, the association with the "old" base-station is terminated and a new association with the base-station serving the new cell is established. This is the handoff or the handover procedure.

Allocation of channels to mobiles may be based on several allocation schemes. The basic one is the Fixed Channel Allocation, in which the total number of channels is partitioned among a number of sets (the reuse factor mentioned above) and each cell is assigned one of these sets. Requests for channel allocation in a cell can be satisfied only from the set assigned to the cell. A more advanced technique, the Dynamic Channel Allocation, places all of the channels in a channel pool. Requests for allocation are then satisfied by borrowing a channel from the pool. A channel is reused only if the new assignment does not interfere with the already assigned channels. A wide variety of the Dynamic Channel Allocation schemes have been published in the technical literature.

The basic impairments affecting wireless communication are: noise, co-channel interference, fading, and adjacent-channel interference. Co-channel interference is caused by assigning more than one mobile the same channel. Of course, the larger the channel reuse distance is, the less co-channel interference is present. However, large reuse distance also corresponds to less channel reuse. The reuse distance is determined as part of the cellular network engineering process.

Basically, there are two types of fading in the mobile radio communication environment: fast fading and slow fading. Fast fading is due to signal multipath propagation. Several models have been used in the literature to describe the envelope of the received fading signal resulting from multipath propagation. Rayleigh distribution leads to the well-known Rayleigh fading, the most famous model. The Nakagami distribution (m-distribution) is a generalized distribution that can model different fading environments. It has greater flexibility and accuracy in matching some experimental data than the Rayleigh distribution. Another model, which considers both the multipath propagated signal plus its line-of-sight component, is called Ricean distribution.

The adjacent-channel interference is the consequence of practical hardware limitations, such as filter nonlinearity and frequency instability. The adjacent-channel interference can be of intracell or intercell type and can be mitigated through improvement in the modulation schemes, through improvement in the hardware implementation, or by spreading in frequency the channels assigned to geographically close cells.

Microscopic diversity, or simply microdiversity, is a technique used to mitigate multipath fading. The name microscopic relates to the distances between independent paths of the signal, typically on the order of a fraction of a wavelength to several wavelengths. The principle of microdiversity is based on the fact that independent signals have a low probability of experiencing deep fades at the same time instant. Therefore, if certain information is independently available on two or more branches (known as diversity branches), the probability that all of the branches suffer from deep fading simultaneously is very low. Thus, by adding the signal from the different branches in a certain way, more of the original signal can be recovered, than when a single branch is used alone. Consequently, the effects of fading can be greatly attenuated. Space, polarization, angle, frequency, time, or some combination of the above have all been used as diversity techniques, along which the independent branches are created. Among the well known techniques in microdiversity used to process the signals from the independent branches are: adaptive equalization, coding, equal gain combining, maximal ratio combining, and selection combining.

Slow fading is also known as long-term fading, shadowing, lognormal fading, or shadow fading. Shadowing is caused by obstructions on the signal's propagation path, such as hills, buildings, foliage, or other vehicles, positioned between a mobile and its base-station. The lognormal distribution model is adopted in the literature to describe the mean square value of the received signal that underwent the effect of shadowing. To model both the fast and long-term fading, the lognormal distribution is combined with the Rayleigh distribution, resulting in the Suzuki distribution.

Macrodiversity, also known as base-station diversity, is a form of large-scale space diversity and is used widely to combat the effects of shadowing in cellular mobile communication networks. The basic idea used in macrodiversity to reduce the shadowing effect is that of avoiding the obstructions. The conventional macrodiversity methods consist of serving a mobile unit with several base-stations simultaneously and choosing the one with the best signal quality. Three methods of base-station selection in macrodiversity-based communication systems have been presented in the technical literature: (i) the signals from all the base-stations are constantly monitored and the one with the strongest power is selected (S-diversity); (ii) the signal-to-noise ratio is constantly computed for all the signals coming from different base-stations and the branch with the largest ratio is chosen (S/I-diversity); (iii) the power of signal plus noise is constantly measured and the base-station with the largest sum is selected (S+I-diversity). The second method of choosing a base-station with the largest signal-to-noise ratio is the most desirable criteria, however, this is also the most difficult scheme to be implemented.

SUMMARY OF THE INVENTION

The present invention provides a novel macrodiversity-based method and system for improved reception of wireless communication signals known as multiply-detected macrodiversity (MDM) in which three or more versions of a signal are detected and a decision-making algorithm is employed that utilizes all of the versions of the signal to maximize the probability that the signal information is correctly received. This is in contrast with conventional macrodiversity techniques which rely on selection of a version of a signal from a single receiver only, this being the one with the best signal quality, and do not take advantage of the information in the signals received by other receivers. The present invention makes use of the signals from these other receivers because, even though they are possibly of inferior quality to the highest quality signal, they may still be useful in improving the overall probability that the signal information is correctly received.

For example, when the signal detected by a serving base-station in a cell of a cellular system is subject to fast fading, or when the interference conditions are worse at the serving base-station than at one or more of the secondary base-stations in the other cells, the signals detected at the secondary base-stations may improve the signal determination performance. The present invention takes advantage of this characteristic by detecting multiple versions of a wireless communications signal, such as that generated by a mobile station, for example, and comparing the signal versions to one another by the decision-making algorithm to determine the information content of the original signal. The decision-making algorithm compares the signals based on a number of factors, such as measured signal strength and interference level. For example, if each of three receivers or base-stations digitally detects a version of the signal, the information content of each detected signal version is compared to each other on a bit by bit basis. If all three values of a particular bit are the same for each receiver or base-station, then that value is decided to be the transmitted value for that bit. However, if one of the receivers or base-stations receives a different value for a bit than the other two base-stations, then this different value may be selected as the correct value, depending upon the relative strengths and interference levels of the three signals.

The foregoing MDM approach maximizes the probability that the information content of a signal will be correctly detected, particularly in circumstances where the signal originates near the boundaries of a cell in a cellular system. In this circumstance, the instantaneous strength of the signal received by the serving base-station in the cell is generally at its weakest, and other base stations in adjacent cells may actually receive a stronger or higher quality version of the signal, depending upon various conditions. In this case, the versions of the signal received by the base-stations in the adjacent cell sites can improve the accuracy of the signal received by the serving base-station.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF A PREFERRED EMBODIMENT

The basic concept of the present invention, multiply-detected macrodiversity (MDM), can be implemented in any type of wireless communication system employing multiple receivers. An example of such a system is described herein for illustrative purposes. However, it should be understood that the fundamental concepts of the present invention are by no means limited to this example.

Figure 1:
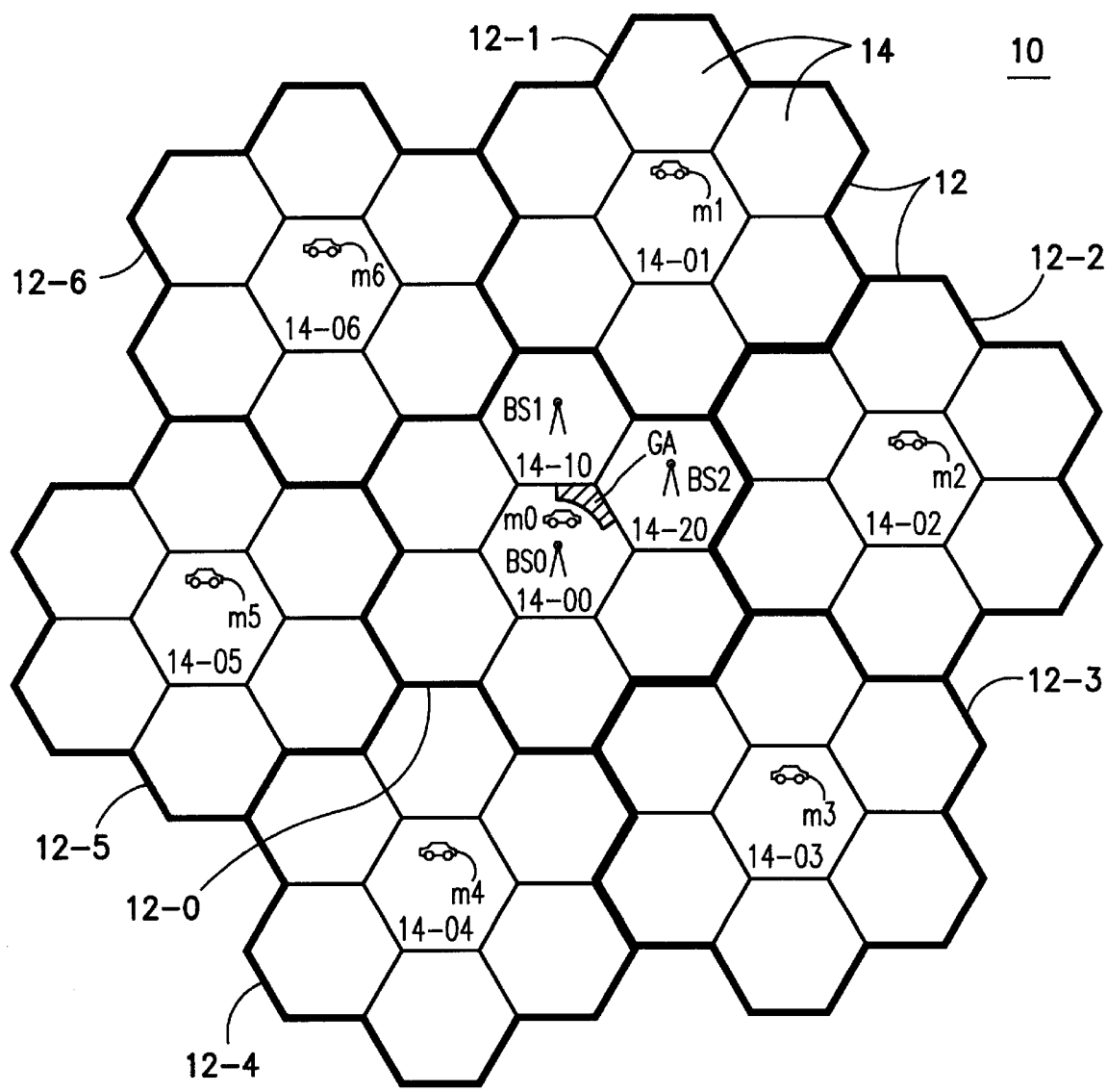
FIG. 1 is a schematic illustration of a cell map for a cellular wireless system that can be adapted for use with the method of the present invention.

FIG. 1 illustrates a cell map 10 for an exemplary conventional cellular wireless system which can incorporate the method of the present invention. In this example, the cell map 10 is comprised of a plurality of cell clusters 12, each of which is formed of seven adjacent hexagonal cells 14. Cellular systems employ multiple cell clusters in which each cell in the cluster is assigned a different channel or set of channels to avoid interference between adjacent cells.

The cells 14 are arranged so that cells in different ones of the clusters 12 that are assigned the same channel will be separated from one another by at least two other cells, thereby minimizing cochannel interference. As an example, consider a mobile station M0 located in the center cell labelled 14-00 of the center cluster labelled 12-0 as illustrated in FIG. 1. If additional mobile stations are located in each center cell 14-01-14-06 of each of the adjacent clusters 12-1 to 12-6 as indicated at M1, M2, M3, M4, M5 and M6, respectively, these mobile stations may be assigned to the same channel to which M0 is assigned. As a result, even though M1–M6 can potentially generate cochannel interference with the signal generated by M0, this will be minimized by the distance between the interfering stations.

As is also conventional in cellular systems, a base-station is centrally located in each of the cells 12 for communicating with any mobile stations located within the cell. Three of these base-stations are indicated for purposes of this example at BS0, BS1 and BS2 in three adjacent ones of the cells in the center one 12-0 of the clusters 12, these being labelled 14-00, 14-10 and 14-20, respectively. In a conventional macrodiversity scheme, the mobile station M0 will be assigned to the base-station which receives the highest quality version of its signal, technically the strongest signal; this will be BS0 as long as M0 is much closer to BS0 than it is to the base-stations in any of the other cells. However, as M0 travels away from BS0 toward the boundary between BS0's cell 14-00 and BS1's cell 14-10 or BS2's cell 14- 20, the signal received by BS0 will become weaker, and at some point, the signal received by either BS1 or BS2 will be of higher quality (e.g., stronger) than that received by BS0. In a conventional macrodiversity scheme based on received signal strength or quality, this will be the point at which M0's serving base-station switches from BS0 to either BS1 or BS2 in a handoff operation.

In the MDM method and system of the present invention, however, all of the versions or replicas of the signal generated by M0 which are received or detected by any of the base stations BS0, BS1 or BS2, for example, are employed together by a decision-making algorithm to determine the information content of the transmitted signal. The advantage of this arrangement occurs in a region of each cell known as the Gain Area which is labelled GA for BS0's cell 14-00 in FIG. 1. Typically, the Gain Area defines a region in each cell where the present invention can result in substantial improvement (e.g., by an order of magnitude or more) in signal detection accuracy (bit error rate or BER).

As a particular example, consider the case where the signal generated by M0 is received or detected by each of the three base-stations BS0, BS1 and BS2. If the versions of the signal received by each of the base-stations are of equal signal-to-interference ratio (SIR), the simple majority voting among the three detected signals will improve the probability of error in the detected signal by approximately squaring the individual probability of error for each signal. (If the individual probability of error is p, then the majority voting with equaled quality signals results in a probability of error equal to $3p^2-2p^3=0(p^2)$ for $p<<1$.)

In the implementation of the present invention, the system continuously monitors the quality of the signal received at the serving base-station, BS0, and the secondary base-stations, BS1 and BS2, to determine the weights that drive the decision-making algorithm. Similar to the different types of conventional diversities, the monitored quality of each signal could be its strength, the SIR, or the total received power (signal plus sign interference). Of course, the best choice is the SIR, since it directly determines the bit-error rate (BER) of the detected and demodulated signal. The SIR could be practically estimated by forcing the mobile station M0 to turn off its transmitter for a very short period of time and measuring the received power during this interval. After the M0 turns its transmitter on again, the S+I power is measured. The SIR is then calculated from these measurements by:

$$S/I=(S+I)/I-1$$

In order to avoid the error due to measuring the interference when the interfering mobile stations themselves are asked to turn off their power, some simple coordination between the measurements at the different base-stations (i.e., at different cell sites) needs to be implemented.

Similarly, one can also use other quantities, such as the signal strength alone or the signal and interference, to drive the decision-making algorithm, although in these cases, the improvement achieved using the scheme of the present invention will likely be less impressive.

Figures 2, 3:
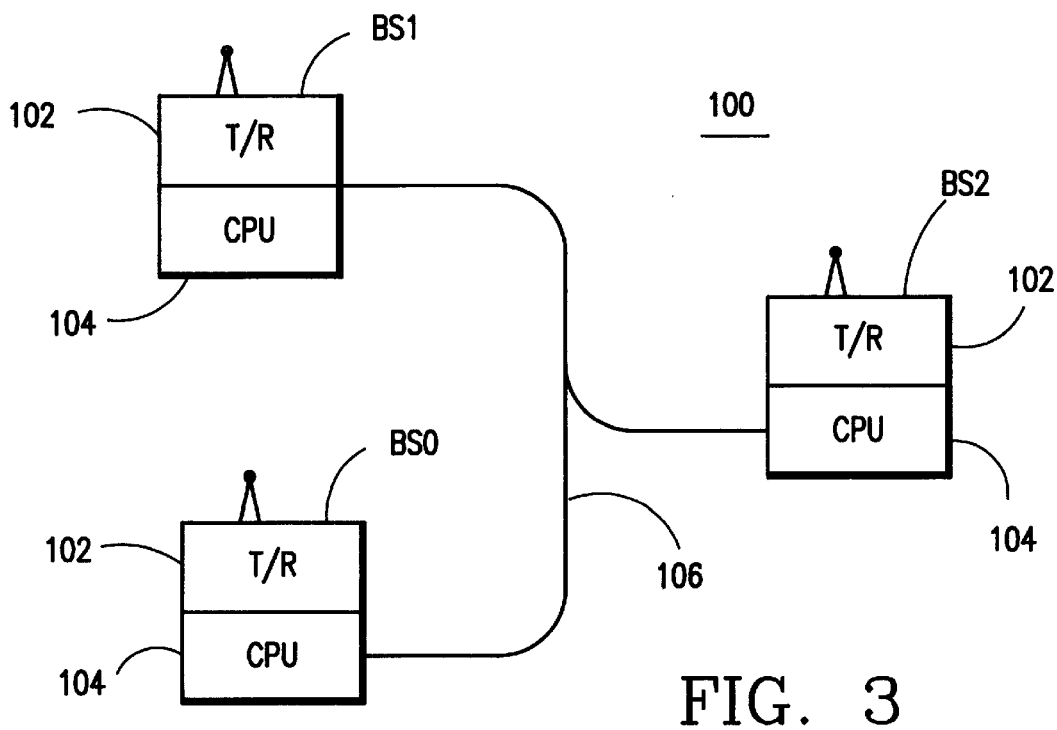
FIG. 2 is a table illustrating an example of a decision-making algorithm that may be employed to implement the method of the present invention.
FIG. 3 is a block diagram of a cellular system for implementing the method of the present invention.

The decision-making algorithm which is employed in the MDM method of the present invention can be pictured as a "black box" accepting two inputs: the base-station's detected data streams and the base-station's measurements indicating the quality of the received mobile signals at the base-stations. FIG. 2 is a table which illustrates one specific example of a decision-making algorithm that can be employed to implement the MDM method of the present invention. This example algorithm is based on a known formula called the "maximum likelihood detection" formula, and operates by comparing the information content of the signals received at the three base-stations BS0, BS1 and BS2, and then deciding on a bit by bit basis, on the most probable identity of each transmitted bit of information. This decision is based upon other conditions, namely the probabilities of an erroneous bit reception at each of the base-stations. In FIG. 2, these probabilities for base-stations BS0, BS1 and BS2, are Pe0, Pe1 and Pe2, respectively. In the example illustrated in FIG. 2, the probabilities of a correct bit reception for base-stations BS0, BS1 and BS2, which are Pc0, Pc1 and Pc2, respectively, are also employed in the decision-making algorithm. However, these can be derived from Pe0, Pe1 and Pe2, and need not be employed in the method of the present invention.

As illustrated in FIG. 2, these six values are multiplied with one another in groups of three to form six test values that are compared in pairs with one another, and generate eight possible outcomes labelled A–H. For example, the A outcome is satisfied if (1) (Pc0×Pc1×Pe2) is greater than (Pe0×Pe1×Pc2), (2) (Pc0×Pe1×Pc2) is greater than (Pe0×Pc1×Pe2), and, (3) (Pe0×Pc1×Pc2) is greater than (Pc0×Pe1×Pe2). If these three conditions are satisfied, the output of the decision-making algorithm for each information bit in the signal is a 0 anytime at least two of the base-stations receive a 0 for that bit, and similarly is a 1 anytime at least two of the base-stations receive a 1 for that bit.

To calculate the probabilities of a correct bit reception (Pc) and an erroneous bit reception (Pe) for each of the base-stations, the SIRs for each base-station must first be determined from the power levels and interference levels for each signal. The SIRs are then used to calculate the probability of a correct bit reception (Pc) and the probability of an erroneous bit reception (Pe) through use of the following formulas:

$$Pc = \left\{ 1 - \frac{1}{2} \cdot erfc\left( \sqrt{\frac{Signal}{\sum_{1,2,3,4,5,6} Interference}} \right) \right\}^2$$

$$Pe = erfc\left( \sqrt{\frac{Signal}{\sum_{1,2,3,4,5,6} Interference}} \right)^2 -$$

$$\frac{1}{4} \cdot \left\{ efrc\left( \sqrt{\frac{Signal}{\sum_{1,2,3,4,5,6} Interference}} \right) \right\}^2$$

FIG. 3 illustrates a general block diagram of an example cellular system 100 for implementing the method of the present invention which incorporates the base-stations BS0, BS1 and BS2. Although the MDM method of the present invention can substantially improve the probability of a correctly received signal, additional equipment is necessary to implement the invention. In particular, each base-station BS0, BS1 and BS2 in the system 100 must be modified with a multiple channel transceiver 102 (each incorporating a transmitter and a receiver) and a central processing unit 104 to facilitate communication with all of its neighboring cells, and processing of signal information received from them in accordance with the decision-making algorithm. Additional bandwidth is also required in a fixed wireline network 106 which is employed to communicate the signal information and control messages between the various base-station transceivers 102 in the system. It should be noted, however, that the scheme does not consume any additional wireless bandwidth. Further, since the Dynamic Channel Assignment schemes, which will most probably be more applicable in the future cellular systems, require installation at each base-station of more than a minimum number of radio cards anyway, it may be argued that the increase in equipment at the base-stations necessary to implement the present invention really is not that substantial.

Although each base-stations in a conventional cellular system also employ multiple channel transceivers, all of their channels are assigned only to mobiles within that base-station's cell. In contrast, each of the multiple channel transceivers 102 in the system 100 not only includes a first group of channels assigned to mobiles within the corresponding base-station's cell, but also includes additional groups of channels assigned to mobiles in immediately adjacent cells. This facilitates detection of a mobile's signal by not only the base-station serving the cell in which the mobile is located, but also by the base-stations serving the adjacent cells. Each of the central processing units 104 need not actually be physically associated with a corresponding base-station, but must be able to receive all detected versions of a signal from each of the base stations BS0, BS1 and BS2. It is thus most convenient to locate the central processing units 104 with the associated base-stations so that a fixed wireline network 106 can be employed to transmit each detected version of a signal to the one of the central processing units 104 designated to employ the decision-making algorithm to determine the information content of the transmitted signal. It should be understood, however, that the fixed wireline network 106 could be replaced with a wireless network if desired.

In contrast with traditional cellular systems in which a mobile is linked most of the time to a single base-station, in the MDM method of the present invention, a mobile is continuously associated with a set of base-stations, namely the mobile's Base-Station Covering Set (BCS). As the mobile roams in the coverage area, the BCS changes; i.e., base-stations that cannot receive the mobile's signal with good enough quality are removed from the BCS and replaced with new base-stations. Thus, the BCS is a dynamic set that is constantly updated. However, a major departure from the traditional cellular system is the fact that, as long as the BCS contains more than one base-station, the mobile never loses network connectivity, even when the BCS is updated. Of course, the probability of dropping a call in this case is lower, since the probability that the current mobile's channel cannot be used in the new cell even for the initial, short period of time, is relatively small. (This would require badly interfering conditions in all the BCS base-stations.) A handoff in the MDM method of the present invention includes continuously monitoring the mobile's signal at the "close by" base-stations to update the BCS list, and choosing from the BCS, one base-station with improved signal quality (the serving base-station). Of course, as the mobile moves more and more into the coverage of the new base-station, the mobile's channel will be reassigned, based on the channel availability in the new cell. Since handoffs in the MDM method and system can be more accurately predicted, it may be appropriate to reserve some channels in the adjacent cells to reduce the probability of a call dropping. In particular, in the MDM method, the number of possible cells that a mobile can be handed off to is limited; in the FIG. 1 example, a mobile with BCS equals {BS0, BS1, BS2} can be handed off only to BS1 or BS2. Thus, more efficient handoff channel reservation schemes can be designed using this knowledge. Furthermore, in contrast with the traditional handoff cases, where a channel has to be allocated at the handoff time, or shortly thereafter, some delay between the handoff and the channel reassignment is plausible in the MDM method. Thus, the channel handoff system, instead of being modeled as a loss system where blocked calls are cleared, is more a delay system with finite delay bounds.

A preliminary investigation of the MDM method of the present invention was conducted using the model illustrated in FIG. 1 with the mobile station M0 generating a signal that is detected by each of the three base-stations BS0, BS1 and BS2. Each one of the three base-stations measures the SIR on its radio link to the mobile station M0. These measurement results are reported to the central processing unit of the served base-station BS0. For this model, it is assumed that M0 is stationary, so that the base-station covering set, BCS, is also constant with BCS={BS0, BS1, BS2}.

The following additional assumptions are also made in this model. The signal attenuation exponent, $\gamma$, is a variable that can assume values of 2.0, 2.5, 3.0, 3.5 and 3.8. Channel reuse is based on the reuse factor of seven as illustrated in FIG. 1, and only the cochannel interference resulting from M1, M2, M3, M4, M5 and M6 is considered even though, in principle, there may be many other cochannel interfering mobile stations from other cell clusters not illustrated in FIG. 1. However, because these mobile stations would reside in cells considerably further away from the serving base-station BS0 than the cells in which M1, M2, M3, M4, M5 and M6 are located, this second and third tear interference can be neglected. The interfering mobile stations M1–M6 are also assumed to be fixed at their locations.

The probability that the channel assigned to a mobile station M0 is used in cell X in labelled by p(X). It is assumed that p(X) is constant for all the cells that, based on the FCA assignment, are assigned this channel. Thus, $$p(M0)=i\ p(M1)=\ldots=p(M6)=p.$$

The interferers are assumed to contribute the maximum possible interference; i.e., in each case considered, the interferers are positioned in their cells in the "worst" case location, on the cell border, and as close as possible to the base-station under question. It is further assumed that the cochannel interferences add in power, and that the statistics of the total interfering signal approximately follows the Gaussian distribution. This approximation is valid when the number of interferers is sufficiently large, however, even when the number of interferers is not quite large, the error introduced by this approximation is not substantial.

The model employs wireless signals which are modulated using the Quadrature Phase Shift Key (QPSK) modulation scheme. Finally, a region will be considered as a Gain Area if the BER of the decision made by the decision algorithm is less than 10% of that made solely by BS0.

The average Gain Area is next evaluated using the foregoing set of assumptions. The word "average" results from the fact that the Gain Area is affected by the interferers' presence or absence. As the interferers have some probability of existence, the average size of the Gain Area can be evaluated by considering all the possible combinations of the interfering sources present. Thus, the average Gain Area is calculated under different probabilities of the interfering channel occupancy (p) and for different exponents of the radio signal attenuation ($\gamma$). The results are calculated for $\gamma$ equal 2.0, 2.5, 3.0, 3.5 and 3.8 for a p varying from 0.0 through 1.0 with an increment of 0.05.

The first step in calculating the average Gain Area is to calculate the power of the cochannel interference for a certain interference pattern. This power is defined as $P_m/d^\gamma$, where $P_m$ is the power transmitted by a mobile station, and d is the distance between the base-station and the interfering mobile station.

The method used to evaluate the size of the Gain Area is to divide the cell into tiny regions, with a point in the middle of each region. Each of these points is checked whether it satisfies the criteria of the Gain Area. Only one sixth of a cell needs to be inspected because of the hexagonal symmetry. In this model, the Gain Area is defined to be in the area where the BER of the decision arrived at through use of the present invention is one order of magnitude or lower than the BER obtained using a traditional macrodiversity scheme (Pe0) based on signal strength alone. If a tested point meets the Gain Area criteria, it will be counted as a gain point. The relative size of the Gain Area is thus determined by finding the ratio of the number of the gain points to the total number of points under consideration. Finally, the average Gain Area is obtained by averaging over all of the 64 possible interferers' patterns.

Figure 4:
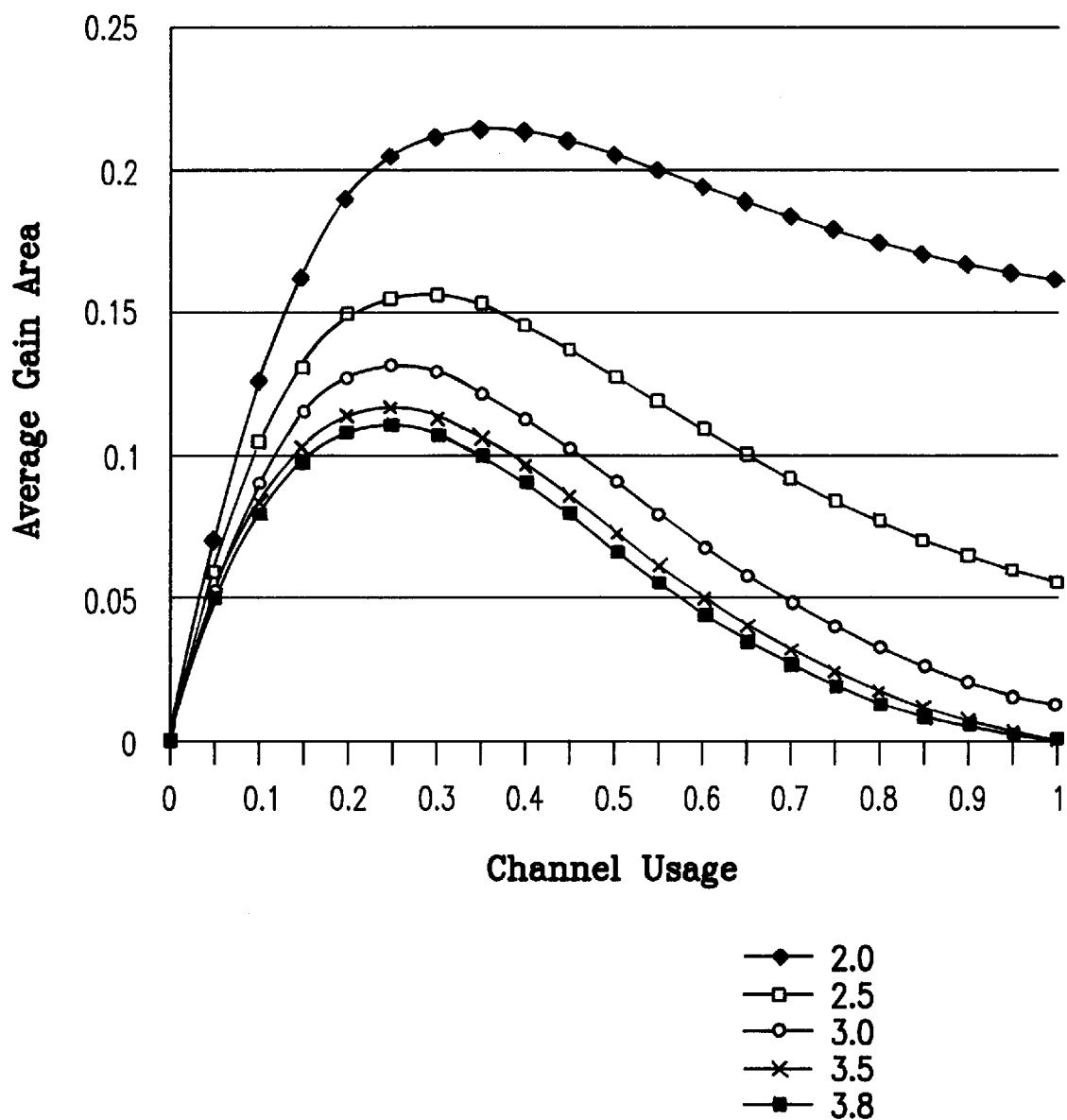
FIG. 4 is a graph illustrating the average gain area versus channel occupancy for a number of different values of radio signal attenuation exponent. The average gain area equals the fraction of the total area of a cell where the method and system of the present invention provides at least an order of magnitude reduction in the bit error rate (BER) of a detected signal over the bit error rate achieved using a conventional macrodiversity detection method.

The results of this analysis are illustrated in FIG. 4, with the size of the Gain Area being displayed as a fraction of the total cell size for different signal attenuations exponents and as a function of the probability of a channel occupancy. As a reference point, a Gain Area of at least 10% is achievable for $0.1<p<0.5$, when $\gamma$ equal 3.0. Of course, most of this 10% area is located at the boundary between the cells. Note also that while p is kept constant, the average Gain Area increases with the decrease in $\gamma$. In fact, for each possible interfering pattern, the Gain Area gets larger as $\gamma$ gets smaller. Also, when $\gamma$ increases, the maximum value of the average Gain Area occurs at a higher value of the channel occupancy probability.

The foregoing establishes that the multiply-detected macrodiversity scheme of the present invention has a considerable potential to improve substantially the performance of wireless systems, especially at the boundary areas between cells in cellular systems. This is exactly the area where improvement and signal reception is most needed. Preliminary studies suggest that this improvement can be on the order of five to six orders of magnitude throughout most of the Gain Area, and may significantly lower the probability of call interruption, especially during the vulnerable period of the mobile handoff.

Although the invention has been disclosed in terms of a preferred embodiment and variations thereon, it will be understood that numerous additional variations and modifications could be made thereto without departing from the scope of the invention as defined in the following claims.

What is claimed is:

1. A method for determining the information content of a transmitted wireless communication signal comprising the steps of:
   a) detecting at least three versions of said transmitted signal, one at each of a corresponding plurality of at least three receivers;
   b) calculating the probability that the information content of each detected version of said transmitted signal is erroneous, said calculating being based at least in part on the strength of each detected version of said transmitted signal; and
   c) employing said calculated probabilities in combination with all of said detected versions of said transmitted signal to determine the information content of said transmitted signal.

2. The method of claim 1, wherein the step of calculating further comprises:
   1) determining the signal-to-interference ratio of each detected version of said transmitted signal; and
   2) calculating the probability that the information content of each detected version of said transmitted signal is erroneous from said signal-to-interference ratio.

3. The method of claim 2, wherein said step of employing further comprises employing said calculated probabilities in combination with all of said detected versions of said transmitted signal in a decision-making algorithm based on a maximum likelihood calculation to determine the information content of said transmitted signal.

4. The method of claim 1, wherein said step of employing further comprises employing said calculated probabilities in combination with all of said detected versions of said transmitted signal in a decision-making algorithm based on a maximum likelihood calculation to determine the information content of said transmitted signal.

5. The method of claim 1, wherein said step of employing further comprises employing said calculated probabilities in combination with all of said detected versions of said transmitted signal to determine the information content of said transmitted signal on a bit-by-bit basis.

6. A system for detecting a transmitted wireless communication signal and determining its information content comprising:
   a) at least three receivers for detecting first, second and third versions, respectively, of a transmitted wireless communication signal;
   b) a processing unit;
   c) means for calculating the probability that the information content of each of said detected versions of said transmitted signal is erroneous, said means for calculating including means for detecting the strength of each of said detected versions and employing said strengths to calculate said probabilities;
   d) means for transmitting each of said detected versions of said transmitted signal from said receivers to said processing unit; and
   e) a decision-making algorithm in said processing unit for employing said calculated probabilities in combination with all of said detected versions of said transmitted signal to determine the information content of said transmitted signal.

7. The system of claim 6, wherein said means for calculating further comprises means for calculating the probability that the information content of each detected version of said transmitted signal is erroneous from the signal-to-interference ratio of each of said detected versions.

8. The system of claim 6, wherein said decision-making algorithm includes means from performing a maximum likelihood calculation to determine the information content of said transmitted signal from said calculated probabilities and all of said detected versions of said transmitted signal.

9. The system of claim 6, wherein means for transmitting further comprises a wireless network interconnecting said receivers with said processing unit.

10. The system of claim 6, wherein said means for transmitting further comprises a wireline network connecting said receivers with said processing unit.

11. The system of claim 6, wherein said receivers are located in adjacent cells of a cellular system.

12. The system of claim 6, wherein said receivers are located in a plurality of base-stations in adjacent cells of a cellular system, and said processing unit is located in one of said base-stations.

* * * * *